United States Patent [19]

Ross et al.

[11] Patent Number: 4,737,934

[45] Date of Patent: Apr. 12, 1988

[54] DATA STORAGE DEVICE AND SYSTEM HAVING AN OPTICALLY NON TRANSMISSIVE CHALCOGENIDE LAYER

[75] Inventors: Randall Ross; Erik Bjornard, both of Birmingham, Mich.

[73] Assignee: Energy Conversion Devices, Inc., Troy, Mich.

[21] Appl. No.: 788,899

[22] Filed: Oct. 18, 1985

[51] Int. Cl.$^4$ .................... G11C 11/42; G11C 13/04
[52] U.S. Cl. ................................. 365/106; 365/113; 365/127
[58] Field of Search ............... 365/106, 113, 120, 127, 365/189

[56] References Cited

U.S. PATENT DOCUMENTS 4,587,209 5/1986 Ohno et al. ................... 365/113
4,653,024 3/1987 Young et al. .................. 365/113

*Primary Examiner*—Terrell W. Fears
*Attorney, Agent, or Firm*—Richard M. Goldman; Marvin S. Siskind

[57] ABSTRACT

Disclosed is an optical data storage device and system, and a method of doing one or more of entering data into, reading data out of, or erasing data from the device. The optical data storage device is characterized by an encapsulated structure including an optically non-transmissive, chalcogenide, phase changeable layer. The phase changeable layer is sufficiently thick such that the impinging vitrifiying energy pulse does not vitrify all the way through the layer.

24 Claims, 2 Drawing Sheets

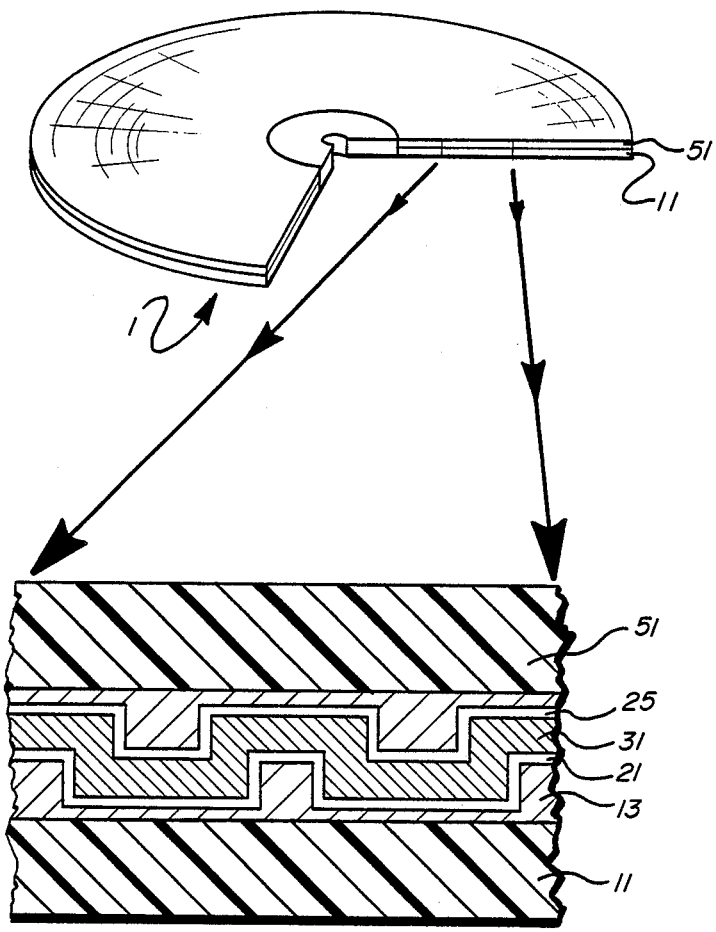
FIG. 1
FIG. 2
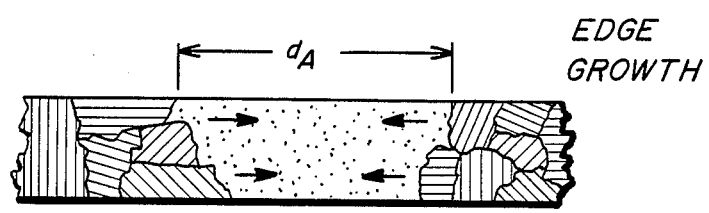
EDGE GROWTH
FIG. 3A
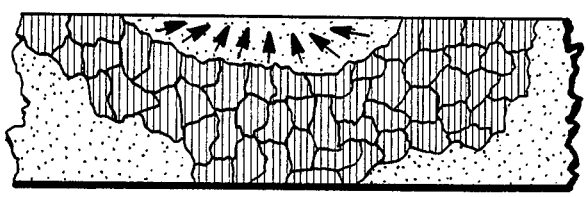
BACK GROWTH
FIG. 3B

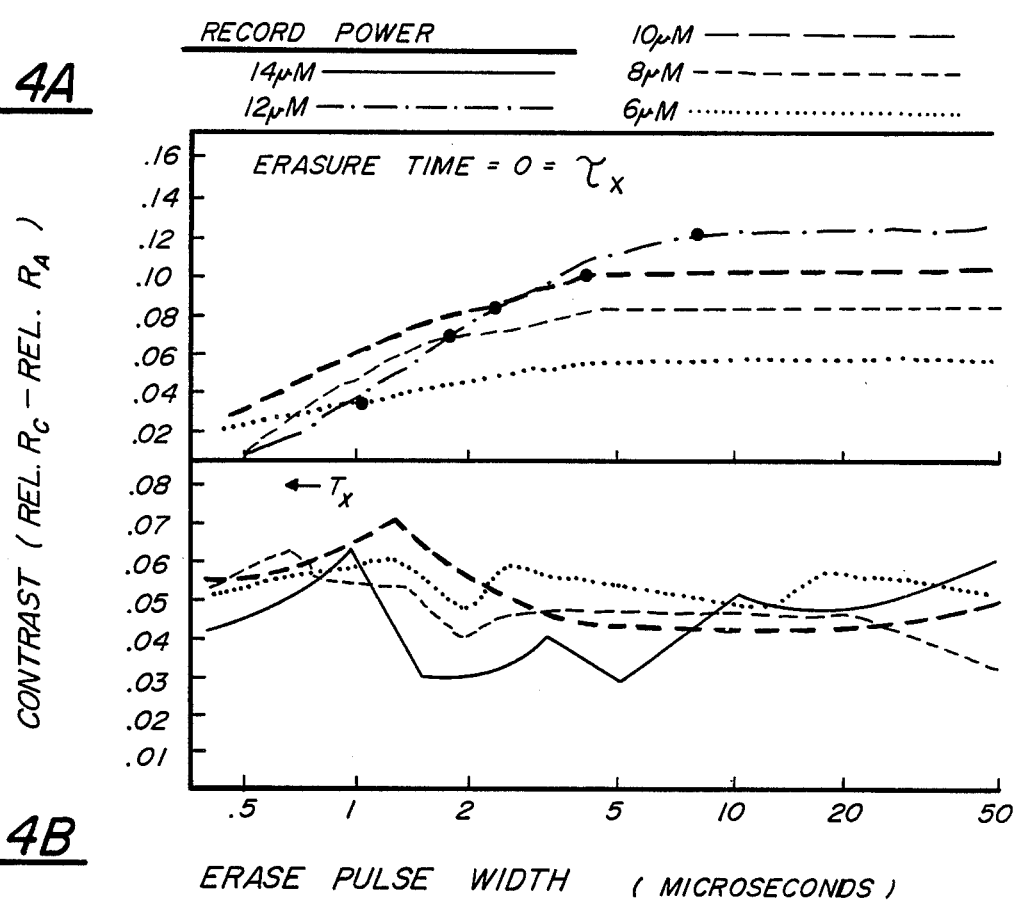
FIG. 4A
FIG. 4B
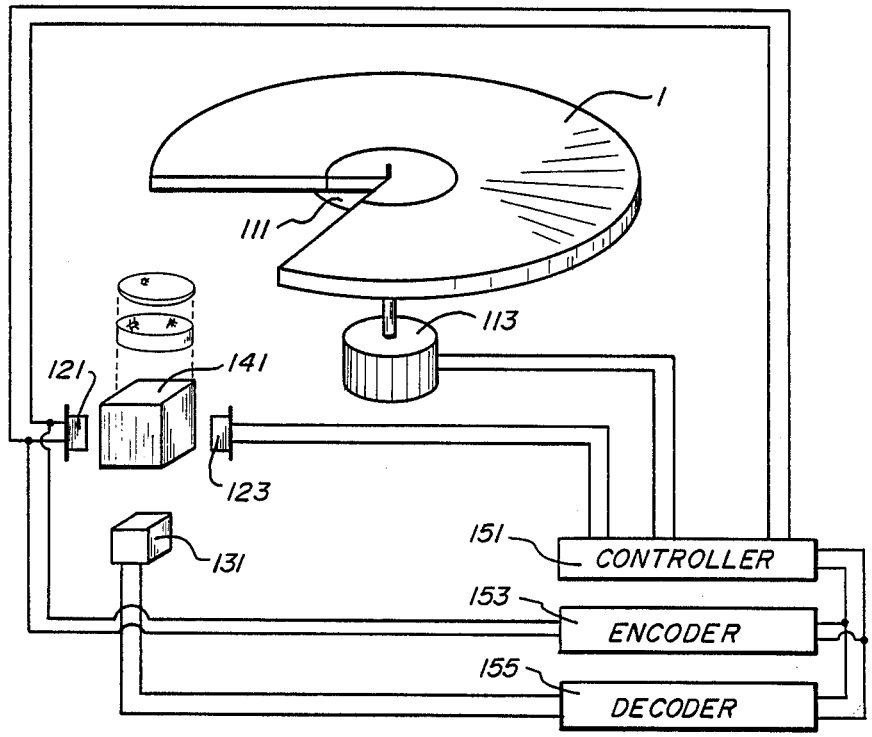
FIG. 5

DATA STORAGE DEVICE AND SYSTEM HAVING AN OPTICALLY NON TRANSMISSIVE CHALCOGENIDE LAYER

FIELD OF THE INVENTION

The invention disclosed herein relates to data storage devices, where data is stored in a material that is switchable between detectable states by the application of projected beam energy thereto.

BACKGROUND OF THE INVENTION

Nonablative state changeable data storage systems, for example, optical data storage systems, record information in a state changeable material that is switchable between at least two detectable states by the application of projected beam energy thereto, for example, optical energy.

State changeable data storage material is incorporated in a data storage device having a structure such that a layer of data storage material is encapsulated between encapsulant layers and supported by a substrate. For optical data storage devices the encapsulants include, for example, anti-ablation materials and layers, thermal insulation materials and layers, anti-reflection materials and layers, reflective layers, and chemical isolation layers. Moreover, various layers may perform more than one of these functions. For example, anti-reflection layers may also be anti-ablation layers and thermal insulating layers. The thicknesses of the layers, including the layer of state changeable data storage material, are optimized to minimize the energy necessary for state change and optimize the high contrast ratio, high carrier to noise ratio, and high stability of state changeable data storage materials.

The state changeable material is a material capable of being switched from one detectable state to another detectable state or states by the application of projected beam energy thereto. State changeable materials are such that the detectable states may differ in their morphology, surface topography, relative degree of order, relative degree of disorder, electrical properties, optical properties including indices of refraction and reflectivity, or combinations of one or more of these properties. The state of state changeable material is detectable by the electrical conductivity, electrical resistivity, optical transmissivity, optical absorption, optical refraction, optical reflectivity, or combinations thereof.

Formation of data storage device is a vacuum process including deposition of the individual layes, for example by evaporative deposition, chemical vapor deposition, and/or plasma deposition. As used herein plasma deposition includes sputtering, glow discharge, and plasma assisted chemical vapor deposition.

Tellurium based materials have been utilized as state changeable materials for data storage where the state change is a structural change evidenced by a change in reflectivity. This effect is described, for example, in J. Feinleib, J. deNeufville, S. C. Moss, and S. R. Ovshinsky, "Rapid Reversible Light-Induced Crystallization of Amorphous Semiconductors," *Appl. Phys. Lett.*, Vol. 18(6), pages 254–257 (Mar. 15, 1971), and in U.S. Pat. No. 3,530,441 to S. R. Ovshinsky for *Method and Apparatus For Storing And Retrieving Of Information*. A recent description of tellurium-germanium-tin systems, without oxygen, is in M. Chen, K. A. Rubin, V. Marrello, U. G. Gerber, and V. B. Jipson, "Reversibility And Stability of Tellurium Alloys for Optical Data Storage," *Appl. Phys. Lett.*, Vol. 46(8), pages 734–736 (Apr. 15, 1985). A recent description of tellurium-germanium-tin systems with oxygen is in M. Takenaga, N. Yamada, S. Ohara, K. Nishiciuchi, M. Nagashima, T. Kashibara, S. Nakamura, and T. Yamashita, "New Optical Erasable Medium Using Tellurium Suboxide Thin Film," *Proceedings, SPIE Conference on Optical Data Storage, Arlington*, VA, 1983, pages 173–177.

Tellurium based state changeable materials, in general, are single or multi-phased systems (1) where the ordering phenomena include a nucleation and growth process (including both or either homogeneous and heterogeneous nucleations) to convert a system of disordered materials to a system of ordered and disordered materials, and (2) where the vitrification phenomenon includes melting and rapid quenching of the phase changeable material to transform a system of disordered and ordered materials to a system of largely disordered materials. The above phase changes and separations occur over relatively small distances, with intimate interlocking of the phases and gross structural discrimination, and are highly sensitive to local variations in stoichiometry.

A serious limitation to the rate of data storage is the slow ordering or erasing time. Ordering or erasing occurs by the crystallization of vitrified or written spots. However, a layer of phase changeable material thin enough to provide first fringe reflection is so thin that vitrification or writing of the spot occurs substantially all the way through the layer. For most active layer compositions, when the spot crystallizes on erasure, it does so from the sides, where there is some unvitrified material to serve as nucleation sites. Thus, the erase time depends, in part, on the diameter of the spot.

SUMMARY OF THE INVENTION

According to the invention herein contemplated, there is provided a data storage device having an optically nontransmissive chalcogen data storage medium layer, a substrate supporting the medium, and dielectric films encapsulating the chalcogenide data storage medium. By "optically nontransmissive" is meant an optical transmissivity of less than approximately 5% in the non-ordered, or vitrified, state. The optical thickness of the chalcogenide layer should be thick enough to provide an optical transmissivity of less than 5% in the non-ordered or vitrified state.

According to the invention herein contemplated, the chalcogenide layer must also be thick enough that the projected beam energy does not vitrify the material all the way through the layer, but only through a top portion, which may be well-shaped. Thus, for energy pulses of comtemplated duration and energy density, the thermal thickness should be such to avoid vitrification all the way through the chalcogenide layer. Underneath the well of vitrified material is material in a crystallized or ordered state.

We have found that the depth of the vitrified spot of phase change material is typically three to ten times smaller then the diameter of the vitrified spot and that crystallization ratio is independent of spot size. Using this finding we have prepared devices with a thicker layer of phase change material then heretofore thought optimal. In this way we have been able to attain a significantly higher crystallization rate then that heretofore observed in similar chalcogenide films of 800 to 1200 Angstroms thickness. Microscopic examination of data storage devices with the herein contemplated thick chalcogenide films shows that this is accomplished by providing seeds or nucleation sites through a phenomenon we refer to as "back growth". By "back growth" we mean that crystals nucleate and crystallization proceeds from unvitrified chalcogenide material in the layer behind and adjacent to the vitrified chalcogen material but remote from the source of vitrifiying energy, i.e., that crystallization proceeds from a region below the vitrified spots.

As herein contemplated the thickness of the chalcogenide layer, that is, the layer of phase change material, must be thick enough that transient heat transfer from the vitrifying or writing pulse of projected beam energy out of the vitrified spot is low enough to avoid complete vitrification all the way through the layer. That is, the projected beam energy does not penetrate all the way through the layer of phase change chalcogenide material.

It is believed that crystallization proceeds from the state-state interface, i.e., the vitrified state-crystallized state interface, with the uncycled crystals serving as nucleation sites. Back growth proceeds much more quickly than the side growth of the prior art, because the axis of growth is perpendicular to the largest dimension of the spot size, instead of parallel to it. As herein postulated back growth proceeds through only about the 0.1 micron depth of the spot rather than through approximately 1 micron radius of the spot as in the case of side growth.

The invention herein contemplated provides self-alignment of the two states along the state-state interface. In the prior art crystallization proceeds through a layer-layer boundary. According to the present invention, crystallization proceeds through a phase-phase boundary of the same material, and new, growing crystals will be properly aligned with the unvitrified crystals. As a result, crystal growth is far less likely to exhibit undesirable patterning and concomitant residual signed upon erasure caused by irregularities in previous growth patterns.

It is believed that back growth results in better control of the size, orientation, volume fraction, and growth rate of the crystals. Thus, it is believed that the optically nontransmissive, crystalline, chalcogenide layer provides consistent, and even preferred orientations, and reduces the time for switching from the less ordered detectable state to the more ordered detectable state.

Moreover, it is believed that the invention reduces the cycle history dependent change in the order of the ordered material. This is because the seeds or nucleation sites are themselves not subject to cycling or state change and as a result the phase change material crystallizes consistently at each cycle. This results in a great improvement in stability and cycle history invariance.

Additionally, the thicker, optically nontransmissive chalcogen layer is internally reflecting. In the prior art, the thickness of approximately the thinner chalcogen layer had to have a thickness of Lambda/2n, where n was the index of refraction and Lambda the wavelength in order to maximize contrast, i.e., minimize vitrified reflectivity and maximize crystallize reflectivity, where contrast equals $R_{crystalline} - R_{amorphous}$.

In the internally reflecting phase change material herein contemplated, incident light is reflected back from both the front (light incident) interface and the vitrified state-crystallized state interface, rather than from the chalcogenide layer-dielectric layer interface. Thus, thickness of the thick, optically nontransmissive layer may be fairly nonuniform as long as certain thicknesses, i.e., the thermal penetration thickness and the optical thickness are exceeded. By way of contrast the thin film chalcogenide structures of the prior art depends critically on the thickness of the active chalcogenide layer. The greater tolerance of layer thickness variation of the present invention results in far fewer manufacturing and quality control problems.

Because of the increase in crystallization rates due to the more favorable geometry of the thick layer structure, chalcogen compounds which are more stable and concomitantly have slower intrinsic switching times may be utilized and still yield good results. Under the prior art, a fast switching chalcogen, such as, for example, $Te_{83}Ge_5Sn_6O_{6-8}$, might be used. $Te_{83}Ge_5Sn_6O_{6-8}$, however, has a crystallization temperature of about 80° C. This relatively low crystalization temperature means that the material may be relatively unstable over time in the amorphous state. With the present invention, the fast switching time of the low crystallization temperatures thin layer material is obtained with a thicker layer of a compound such as $Te_{87-88}Ge_5Sn_6O_{3-4}$, which has a crystallization temperature of 100° C., and is, accordingly, more stable over time.

According to one exemplification of the present invention, there is provided a data storage device comprising a first substrate, a first dielectric layer deposited atop the substrate, and an optically nontransmissive chalcogen phase changeable data storage medium layer deposited atop the first dielectric layer. The optically nontransmissive, chalcogen, phase changeable, data storage medium layer has an ALPHA x D product greater then or equal to 3, where $T = TO\ EXP(-ALPHA \times D)$, and ALPHA = optical absorption coefficient,
D = active chalcogenide layer thickness,
T = transmitted light intensity, and
TO = intensity of light entering the active layer.

Deposited atop the layer of state changeable material may optionally be a second dielectric layer. With the herein contemplated thick chalcogenide layer structure, the second dielectric layer may be unnecessary. A second substrate is located atop that. The resultant device exhibits dynamic tester cycle-history invariance through more than at least 17,000 cycles with contrast of about 40 or more decibles, with complete erasability.

In a further exemplification, there is provided a data storage system comprising a data storage device containing nontransmissive, chalcogenide, phase changeable data storage medium, a means for imparting relative motion thereto, projected energy beam means, means for determining the state of the memory material, and controller means for synchronizing the projected beam energy means and the relative movement means.

In a further exemplification, one or more of writing data into a data storage device, reading data out of the data storage device, or erasing data from the data storage deivce is performed. The method comprises writing data into the data storage medium with electromagnetic energy of a first energy density and duration, reading the state of the data storage medium with electromagnetic energy of a second energy density and duration, and erasing data from the data storage medium with electromagnetic energy of a third energy density and duration.

Exemplary chalcogenide compositions useful in providing the chalcogenide data storage medium include tellurium, for example, where the tellurium is present with a cross linking agent or agents. The chalcogenide composition is reversibly switchable between detectably different states.

Suitable cross linking agents are elements of groups IIIB, IVB, and VB of the Periodic Table. These include boron, aluminium, indium, and gallium from Group IIIB, silicon, germanium and tin from Group IVB, nitrogen, phosphorous, arsenic, antimony, and bismuth from Group VB, as well as combinations thereof. Exemplary cross linking agents from Groups IIIB, IVB, and VB of the periodic table include silicon, germanium, tin, arsenic, antimony, and mixtures thereof, expecially silicon, and/or germanium, either alone or with one or more of tin, arsenic, or antimony. Especially preferred is germanium, either alone, or with tin. Additionally, other chalcogens, as selenium and sulphur, may be present.

Exemplary chalcogenide compositions include the chalcogen e.g. tellurium, and a cross linking agent, e.g. silicon and/or germanium, or silicon and/or germanium with another cross linking agent in the medium sufficient to form a stable chalcogenide. Additionally oxygen, or a switching modulator, as Ni, Pt, or Pd, may be present. Generally, the atomic ratio of the cross linking agent to total composition is from about 1 percent to about 20 atomic percent.

The data storage medium may be formed by depositing the materials to form a deposit thereof. The deposit may be more than 2000 Angstroms thick.

THE DRAWINGS

The invention may be particularly understood by reference to the drawings appended hereto.

FIG. 1 is a partial cut away isometric view, not to scale, with exaggerated latitudinal dimensions and vertical scale, of an optical data storage device.

FIG. 2 is a detailed section of the part of the optical data storage device of FIG. 1 showing the relationship of the various layers thereof.

FIGS. 3a and 3b shows the crystal growth patterns of an erased spot on a layer of chalcogenide data storage material formulated according to, respectively, the prior art and the invention herein contemplated.

FIGS. 4a and 4b represent, respectively erase times of the prior art and of the herein contemplated invention plotted against contrast at various record powers.

FIG. 5 shows a data storage system incorporated the data storage medium layer of the present invention.

DETAILED DESCRIPTION OF THE INVENTION

According to the invention described herein, there is provided a projected beam storage device having a thick layer of data storage medium. The layer of medium is substantially optically non-transmissive and a portion thereof is switchable between detectable states by the application of projected beam energy thereto.

The layer of phase changeable chalcogenide material herein contemplated is thicker then the "optical thickness" and "thermal penetration thickness" thereof. The thermal penetration thickness is the maximum distance into the phase changeable chalcogenide, measured from the projected energy beam incident side, that is heated to a temperature high enough to cause vitrifiction by the projected energy beam. The chalcogenide phase change material beyond the thermal penetration thickness is not vitrified by the projected energy beam. It may, however, be crystallized directly by the beam.

The thermal penetration thickness is a function of the projected energy beam's energy, wavelength and duration. It is also a function of the thermal conductivity, k, and the specific heat, $C_p$ of the chalcogenide material, and of the maximum temperature, $T_m$, attained by the projected energy beam incident side of the chalcogenide phase change.

An approximate theoretical calculation of the thermal penetration thickness may be made using the methods described in William H. McAdams, *Heat Transmission*, Third Edition, McGraw-Hill Book Company, Inc., New York, NY (1954), at Chapter 3, "Transient Conduction", page 39, "Semi-infinite Solid", in R. Byron Bird, Warren E. Stuart, and Edwin N. Lightfoot, *Transport Phenomena*, John Wiley & Sons, Inc., New York, NY (1960), at Chapter 11, "Temperature Distributions With More Then One Independent Variable", Example 11.1-1, "Heating of a Semi-Infinite Slab", at page 353-354, and in H.S. Carslaw and J.C. Jaeger, *Conduction of Heat In Solids*, Second Edition, Oxford University Press (1959), all of which are incorporated herein by reference.

Using the methods described in the above incorporated texts, the thermal penetration thickness, d, may be calculated by assuming (1) a maximum temperature, $T_m$, at the thermal penetration thickness, d, less then or equal to the melting temperature of the chalcogenide phase change material, (2) a maximum temperature, $T_s$, at the projected energy beam incident surface of the chalcogenide phase change material, and (3) an initial temperature, To, of the chalcogenide phase change layer, e.g. ambient temperature. These temperatures may be related through a reduced dimensionless "unaccomplished temperature change", Y, which is defined by:

$$Y = \frac{Ts - Tm}{Ts - To}$$

The physical properties of the chalcogenide phase change material are related through the dimensionless number Z, which is defined as $$Z = \frac{d}{2 \times \text{Square Root (ALPHA} \times \text{THETA)}}$$

where $$\text{alpha} = \frac{\text{Thermal Conductivity}}{\text{Density} \times \text{Specific Heat}}$$

and theta = projected energy beam pulse duration

Using the above mathematic models and assumed temperature limitations, and following the procedures described in the above incorporated texts, and the graphical solutions, the theoreticaly predicted thermal energy penetration thickness for a 200 nanosecond pulse is about 2000 Angstroms.

Actual experimental observations have shown that for record pulse widths of about 200 nanoseconds, and record powers of about 1 to 5 milliwatts, a chalcogenide phase change layer thickness of above about 2000 to 2500 Angstroms is adequate to provide back crystallization, with greater thicknesses being desirable to provide a substantial absence of optical transmissivity through the chalcogenide phase change layer and to act as an encapsulant and/or dielectric.

In a particularly preferred exemplification of the invention, the energy profile of the projected energy beam means is established or controlled to provide a laterally uniform thermal penetration depth such that crystallization and vitrification occur only within a distance d* of the projected energy beam incident side of the phase change chalcogenide layer. The distance d* is defined by $$d^* = Lambda/4n.$$

Lambda is the wavelength of the projected energy beam, and n is the index of refraction of the vitrified phase change chalcogenide material. The thickness d* gives the maximum contrast between written and erased states.

FIGS. 1 and 2 show a projected beam data storage device 1 of the invention, having a substrate, for example a plastic substrate 11, a first encapsulating dielectric layer 21, for example a first germanium oxide encapsulating layer, a chalcogenide data storage medium layer 31, a second dielectric layer 41, e.g., a second germanium oxide layer 41, and a second substrate, e.g., plastic substrate 51.

FIG. 2 shows a section of the data storage device 1 of FIG. 1 in greater detail. As there shown, the substrate 11 is a polymeric sheet, for example a polymethyl methacrylate sheet. The substrate 11 is an optically invariant, optically isotropic, transparent sheet. The preferred thickness of the substrate 11 is from about 1 mm to about 1.5 mm.

Atop the substrate 11 is a film, sheet, or layer 13, e.g., a photoinitiated, polymerized acrylic epoxide sheet. Polymerized, molded, or cast into the polymeric sheet 13 may be grooves. When grooves are present they may have a thickness from about 500 to about 1000 Angstroms. The film, sheet, or layer 13 may act as an adhesive, holding the substrate 11 to the encapsulants. It has a thickness of from about 30 to about 200 microns and preferably from about 50 to about 100 microns.

Deposited atop the photo-polymerized sheet 13 is a dielectric barrier layer 21. The dielectric barrier layer 21, for example, of germanium oxide, is from about 500 to about 2000 angstroms thick. The dielectric barrier layer 21 has one or more functions. It serves to prevent oxidizing agents from getting to the chalcogen active layer 31 and prevents the plastic substrate from deforming due to local heating of the chalcogenide layer 31, e.g., during recording or erasing. The barrier layer 21 also serves as an anti-reflective coating, increasing the optical sensitivity of the chalcogenide active layer 31.

Other dielectrics may provide the encapsulating layers 21, 41. For example, the encapsulating layers may be silicon nitride, layered or graded to avoid diffusion of silicon into the chalcogenide layer 31. Alternatively, the encapsulating dielectric layers 21, 41 may be silica, alumina, or other dielectric. Alternatively, the chalcogenide layer may be thick enough to be self encapsulating.

The chalcogenide data storage medium 31 has a thickness (1) of at least d, where d is the thermal penetration depth described above, (2) greater than about d* where Lambda is the wave length of the projected beam energy, and n is the index of refraction of the crystalline data storage medium, and (3) an optical thickness great enough to be substantially optically non-transmissive as described above and internally reflecting. The thickness of the layer of chalcogenide data storage medium is at least about 2000 Angstroms and preferrably from about 2000 to 4000 Angstroms.

Atop the chalcogenide layer 31 and in contact with the opposite surface thereof is a second dielectric layer 41, e.g., a germanium oxide layer. The second dielectric layer 41 when present, may, but need not be of equal thickness as the first layer 21. However, because the herein contemplated thick chalcogenide layer 31 is a good thermal barrier, the second dielectric layer 41 may be omitted. A second photopolymer layer 49 and a second substrate layer 51 are in contact with the opposite surface of the encapsulating layer 41.

The polyacrylate layers 13, 49, are cast or molded in place. These layers 13, 49 can be photo-polymerized in place, e.g., by the application of ultra-violet light. The barrier layers 21, 41, are deposited, by evaporation, for example, of germanium and germanium oxide materials, or by sputtering, including reactive sputtering where the oxygen content of the reactive gas used in reactive sputtering is controlled. The chalcogenide film 31 may be prepared by evaporation, or by sputtering, or by chemical vapor deposition.

FIGS. 3a and 3b illustrate the difference in growth pattern between crystal growth in an erased spot in a thin film medium of the prior art and in the thick film medium of the present invention. In FIG. 3a, the thickness of the data storage medium layer is on the order of 1000 Angstroms. At this thickness, the incident erasing energy beam vitrifies a spot through substantially the whole thickness of the layer. When the spot recrystallizes, crystal growth will proceed from unvitrified crystals which can serve as nucleate sites at the edges the spot. This results in an inward moving crystallization front, i.e., edge growth. With this edge growth pattern, crystallization time will be slow because growth must proceed through the whole diameter of the erased spot.

FIG. 3b, the layer of chalcogenide material is much thicker, on the order of 2000 to 5000 Angstroms. The incident vitrifying pulse vitrifies a spot only partially through the layer, leaving a back layer of crystals surrounding and beneath the well of vitrified material. As the spot recrystallizes, this back layer provides nucleation sites. Since crystal growth is in a direction perpendicular to the diameter of the relatively shallow erased spot, the spot will recrystallize much more quickly. In addition we have found that the orientation of the crystals in the back layer 41 may be controlled such that they all have the same orientation with th tellurium c-axis oriented from film front to back. The orientation of back layer crystals within the chalcogenide film 41 may be controlled techniques, for example, by providing composition gradiants in the phase change material layer 41 whereby to provide a graded crystallization temperature, or by providing a seeding layer. For example the crystallization temperature remote from the projected energy beam may be higher then the crystallization temperature on the energy beam incident side of the phase change material layer 41. The gradiant may be linear, or discrete.

The concomitant improvement in erasure time is illustrated by FIGS. 4a and 4b where the erase time of thin and thick film phase change layers are shown. In these graphs, the erase pulse width, i.e., time in microseconds, is plotted against the contrast for various record powers. The spot is considered to be erased when the contrast maximizes and levels out. In FIG. 4a, where edge growth was the mechanism of erasure in film of phase change material the point of erasure did not occur until between 1 and about 9 microseconds had elapsed. In FIG. 4b, where back growth was the postulated mechanism in a 4000 Angstrom thick film, the point of erasure was reached before 0.5 microseconds, and the rise and leveling out pattern could not be detected. The erase time was below the ranges ordinarily observed with films 800 to 1200 Angstroms thick.

According to a further exemplification of the invention shown in FIG. 7, there is provided an optical data storage system adapted for use with the optical data storage device shown in FIGS. 1 and 2 and having an optically non-transmissive, chalcogenide, phase changeable data storage medium layer therein. The system includes means for imparting relative motion to the disc 1, as turntable means 111 driven by motor means 113.

The system has projected energy beam means for writing data into the phase changeable chalcogenide data storage medium, reading data out of the phase changeable chalcogenide data storage medium, and erasing data from the phase changeable chalcogenide data storage medium. The projected energy beam means includes recording or writing means for vitrifying a cell of the phase changeable chalcogenide data storage medium to a relatively disordered state, erasing means for crystallizing a cell of the phase changeable chalcogenide data storage medium, and reading means for determining that state of the phase changeable chalcogenide data storage medium.

The projected beam energy means, e.g., laser means 121 and 123 are controlled by controller means 151 and encoding means 153 when in the "write" and "erase" or "vitrify" and "crystallize" modes. When in the "read" mode the projected beam energy means utlizes photo-detector means 131 and decoder means 155, controlled by the controller means, to determine the state of the cell of phase change memory material.

The controller means 151 also includes tracking means for synchronizing the projected beam energy means, the turntable means 111, and the motor means 113.

Utilizing the relatively thick film, substantially optically non-transmissive, phase changeable, chalcogenide data storage medium of the invention, it is possible to do one or more of enter data into, read data out of, or erase data from an optical data storage device of the type described hereinabove. While the invention has been described with respect to certain preferred exemplifications and embodiments thereof it is not intended to be bound thereby but solely by the claims appended hereto.

We claim:

1. In an optical data storage device comprising:
   (a) a first substrate
   (b) a first encapsulating layer on the first substrate;
   (c) a phase changeable data storage medium layer supported by and in contact with the first encapsulating layer; and
   (d) a second encapsulating layer encapsulating the pase changeable data storage medium layer the improvement wherein the layer of phase changeable data storage medium has (e) a region of optical thickness, d*, in which phase change occurs, said thickness, d*, being defined by the formula $$=d^* = LAMBDA/4n$$

wherein n is the index of refraction of vitrified phase changeable data storage medium and LAMBDA is the wave length of energy applied thereto, (f) a region of thermal penetration thickness d which is the maximum distance into the phase change material, measured from the projected beam incident side, that is heated to a temperature high enough to cause vitrification by the projected energy beam, the thermal penetration region being the only region of the phase change medium layer heated hot enough for vitrification to occur, the thermal penetration region thickness, d, being defined by $$d = Z \times 2 \times Square\ Root\ (ALPHA \times THETA)$$

and $$Y = (Ts - Tm)/(Ts - To)$$

where

Z = a dimensionless number;

ALPHA = thermal conductivity divided by density and specific heat of the phase change material;

THETA = projected energy beam pulse duration;

Ts = maximum temperature of the projected beam energy incident surface of the layer of phase change material;

Tm = maximum temperature at the thermal penetrates thickness, d, into the phase change material form the projected beam incident surface thereof; and To = initial temperature of the phase change material; and and where Z and Y are related by solution of $$(ALPHA)^2 Temperature = partial\ of\ temperature\ with\ respect\ to\ time.$$

for a slab;

said layer of phase changeable data storage medium being thicker then said optical thickness and said thermal penetration thickness whereby said phases changeable data storage medium beyond the optical and thermal penetration thickness from the energy beam incident side of the phase change material does not undergo phase change, whereby the portions of phase changeable material which undergo pahse change back crystallize from portions of pahse change material which do not undergo phase change at a vitreous state-crystalline state interface therebetween, and said layer of phase change material being substantially optically non-transmissive.

2. The optical data storage device of claim 1 wherein the phase change material comprises a chalcogne.

3. The optical data a storage device of claim 2 wherein the chalcogen is tellurium.

4. The optical data storage device of claim 1 where phase change occurs in a region of a thickness tuned to give maxiumum contrast.

5. The optical data storage device of claim 1 where phase change occurs in a region having a thickness given by the formula d* =LAMBDA/4n, where d* is the thickness of the region, n is the index of refraction of the vitrified phase change material, and Lambda is the wavelength of energy applied thereto.

6. The optical data storage device of claim 1, wherein the phase changeable data storage medium layer is internally reflecting.

7. The optical data storage device of claim 6, wherein the phase changeable data storage medium layer is internally reflecting at a state-state interface.

8. The optical data storage device of claim 1, wherein back crystallization is vertical.

9. The optical data storage device of claim 1, wherein back crystallization occurs along an axis perpendicular to the state-state interface.

10. The optical data storage device of claim 1 wherein back crystallization of the phase changeable data storage medium occurs with the c-axis of the meidum crystallites oriented perpendicular to vitreous state-crystalline state interface.

11. The optical data storage device of claim 1, wherein the phase changeable data storage medium layer has a thickness of greater than 2000A°.

12. The optical data storage device of claim 11, wherein the phase changeable data storge medium layer has a thickness of 2000 Angstroms to 5000 Angstroms.

13. The optical data storage device of claim 11 wherein the phase changeable data storage medium layer has a graded composition.

14. The optical data storage device of claim 1 wherein the phase changeable data storage medium layer further comprises a seeding agent.

15. In an optical data storage system for use with an optical data storage device having incorporated therein a layer of phase changeable data storage medium layer, said system comprising
  (a) recording means for vitrifying a cell of the phase changeable data storage medium layer to a relatively disordered state;
  (b) means for crystallizing a cell of the phase changeable data storage medium layer to a relatively ordered state;
  (c) means for applying a projected energy beam to the medium to determine the state of the medium;
  (d) means for imparting relative movement to the optical data storage device with respect to the projected energy beams, and
  (e) tracking means for synchronizing the projected energy beam with respect to the relative movement of the optical data storage device,
the improvement wherein the layer of phase changeable data storage medium has
a region of optical thickness, d*, in which phase change occurs, said thickness, d*, being defined by the formula $$d^* = LAMBDA/4n$$

wherein n is the index of refraction of vitrafied phase changeable data storage medium and LAMBDA is the wave length of energy applied thereto,
(f) a region of thermal penetration thickness d which is the maximum distance into the phase change mateiral, measured from the projected beam incident side, that is heated to a temperature high enough to cause vitrification by the projected energy beam, the thermal penetration region being the only region of the phase change medium layer heated hot enough for vitrafication to occur, the thermal penetration region thickness, d, being defined Oy $$d = Z \times 2 \times Square\ Root\ (ALPHA \times THETA)$$

and
$$Y = (Ts - Tm)/(Ts - To)$$

where
Z = a dimenisonless number;
ALPHA = thermal conducitivity divided by density and specific heat of the phase change material;
THETA = projected energy beam pulse duration;
Ts = maximum temperature of the projected beam energy incident surface of the layer of phase change material;
Tm = maximum temperature at the thermal penetrates thickness, d, into the phase change material from the projected beam incident surface thereof; and
To = initial temperature of the phase change material; and
and where Z and Y are related by solution of (Alpha)² Temperature = partial of temperature with respect to time.
for a slab;
said layer of pahse changeable data storage medium being thicker then said optical thickness and said thermal penetration thickness whereby said phase changeable data storage medium beyond the optical and thermal pentration thickness from the energy beam incident side of the phase change material does not undergo phase change, whereby the portions of phase changeable material which undergo phase change back crystallize from portions of pahse change material which do not undergo pahse change at a vitreous state-crystalline state interface therebetween, and said layer of pahse chnage material being substantially optically non-transmissive.

16. The optical data storage system of claim 15 wherein the phase change material comprises a chalogen.

17. The optical data storage system of claim 16 wherein the alcogen is tellurium.

18. The optical data storage system of claim 15 where phase change occurs in a region of a thickness tuned to give 18 maxiumum contrast.

19. The optical data storage system of claim 15 wherein the phase changeable data storage medium layer is internally reflecting at a state-state interface.

20. The optical data storage system of claim 15 wherein back crystallization of the optical data storage medium is vertical.

21. The optical data storage system of claim 20, wherein the back crystalline of the phase changeable data storage medium occurs along an axis perpendicular to the vitreous state-crystalline state interface.

22. The optical data storage system of claim 20, wherein the back crystallization of the phase changeable data storage medium occurs with the c-axis of the medium crystallites oriented perpendicular to the vitreous state-crystalline state interface thereof.

23. The optical data storage system of claim 15, wherein the phase changeable data storage medium layer has a thickness of greater than 2000 Angstroms.

24. The optical data storage system of claim 23, wherein the phase changeable data sotrage medium layer has a thickness of 2000 Angstroms to 5000 Angstroms.

* * * * *